3,119,763
HYDROCRACKING PROCESS AND CATALYSTS
Robert H. Haas and Anthony J. Tulleners, Fullerton, Calif., assignors to Union Oil Company of California, Los Angeles, Calif., a corporation of California
No Drawing. Filed Jan. 12, 1961, Ser. No. 82,174
8 Claims. (Cl. 208—109)

This invention relates to the catalytic hydrocracking of high-boiling hydrocarbons to produce therefrom lower boiling hydrocarbons, boiling for example in the gasoline or jet fuel range. The invention is directed more specifically to certain novel catalyst pretreatment methods for improving the activity and selectivity of hydrocracking catalysts composed of a silica-containing, refractory oxide cracking base upon which is distended a hydrogenating component of the group consisting of nickel and cobalt. Briefly, the basic novel features of the invention involve a pretreatment technique wherein the fresh or regenerated hydrocracking catalyst is first subjected to a reduction treatment in the presence of both hydrogen and steam, and is then subjected to a sulfiding treatment with for example hydrogen sulfide-containing gases, or a sulfur-containing hydrocarbon feedstock. It has been found that the combination of the two pretreating steps in the specified order gives a catalyst of optimum activity and selectivity, as compared to either step alone, or both steps in the opposite order.

It is a principal object of this invention to provide hydrocracking catalysts displaying an optimum combination of selectivity and activity. Another objective is to extend the total active life of hydrocracking catalysts, and to obtain the most efficient use thereof during their life span. A specific objective is to improve the overall activity of presulfided hydrocracking catalysts. Conversely, another objective is to improve the selectivity of hydrocracking catalysts which have been subjected to a wet hydrogen reduction pretreatment. Other objectives will become apparent from the more detailed description which follows.

It is well known that composites of nickel and/or cobalt deposited upon silica-containing cracking bases are active hydrocracking catalysts. The hydrogenating component (nickel and/or cobalt) may be present as free metal, or other compounds such as the oxides or sulfides. The free metal form is advantageous from the standpoint of obtaining maximum overall activity, but has been found to be disadvantageous from the standpoint of selectivity. A catalyst of low selectivity does not give optimum gasoline yields, but rather tends to produce relatively large amounts of undesired products such as coke, methane, ethane and the like. The conversion of feed to these undesirable products represents a substantial loss of feed and hydrogen, and the deposition of coke accelerates the deactivation of the catalyst.

It has been found that the selectivity of nickel and/or cobalt-containing hydrocracking catalysts can be substantially improved by converting it at least partially to a sulfide form. This however results in a substantial decline in overall activity, in terms of total feed converted per pass. It has now been found that by the combination of wet hydrogen pre-reduction followed by presulfiding, catalysts are obtained which display an activity substantially the same as that of the free metal form of catalyst, and a selectivity substantially equal to that of the conventional sulfide forms of the catalyst. Conventional presulfiding techniques involve treating the catalyst in the oxide or free metal state with dry sulfiding agents, e.g., mixtures of hydrogen and hydrogen sulfide. In some instances, the catalyst is subjected to a dry hydrogen pre-reduction before the sulfiding step, but it has been found that pre-reduction with dry hydrogen does not give the desirable results of the wet hydrogen pre-reduction of this invention.

The initial pretreatment with steam and hydrogen may be carried in a number of different ways. The essential requirements are merely that the catalyst be contacted with a gaseous stream containing both hydrogen and steam at temperatures ranging between about 300° F. and 1,200° F., and preferably between about 500° and 900° F. The treatment may be carried out at atmospheric or subatmospheric pressures, but preferably superatmospheric pressures of e.g., 100 to 3,000 p.s.i.g. are utilized. Any amount of steam added to the hydrogen stream will effect some improvement in the resulting activity, but normally about 0.1 to 10 mole-percent of steam in the hydrogen stream is used, based on the hydrogen content. However, it is contemplated that amounts as low as 0.01 mole-percent and as high as 90 mole-percent may be used. The time of treatment varies widely, depending upon the concentration of steam in the pretreatment gas, and the severity of treatment. When utilizing severe conditions of treatment, i.e., high pressures and/or high temperatures, or when using high concentrations of steam, the treatment may be sufficiently complete within about 0.1 to 10 hours; conversely under less severe conditions, or when using low concentrations of steam, longer periods may be required, e.g., 10 to 100 hours.

The pretreatment gases may consist entirely of hydrogen and steam, or other components may be present. For example, a substantially sulfur-free hydrocarbon feedstock (containing less than about 0.01% sulfur) may be included along with the pretreatment gases under conditions to effect a simultaneous hydrocracking thereof. The treatment may be continuous, or there may be an alternate treatment with dry hydrogen and then with wet hydrogen. Various other modifications will be apparent to those skilled in the art; the essential requirements are simply that the catalyst be contacted at the specified temperatures with gases containing effective proportions of both hydrogen and steam.

Following the steam-hydrogen pretreatment step, the catalyst may be utilized directly for hydrocracking a sulfur-containing feed, e.g., one containing 0.01–5% by weight of sulfur, whereby sulfiding is effected concurrently with hydrocracking. Alternatively, it may be subjected to a separate presulfiding step wherein hydrogen sulfide (preferably diluted with other gases such as hydrogen, nitrogen, methane, etc.), or some other decomposable sulfur compound such as thiophene or carbon disulfide, is contacted with the catalyst. The separate presulfiding operation may be conducted under conditions of temperature and pressure similar to those utilized in the hydrogen-steam treatment. Normally, the presulfiding is continued until the hydrogen sulfide content in the off-gases indicates that substantially complete sulfiding has been accomplished. In some cases it is found that a separate presulfiding operation is desirable, in preference to allowing the sulfiding to proceed concurrently with the hydrocracking of a sulfur-containing feed. In either case, sulfiding may take place under dry conditions, or steam may also be present. In one modification, the steam-hydrogen pretreatment may simply be continued under the same conditions, with hydrogen sulfide being added to the pretreatment gases. Sulfiding pretreatments are per se well known in the art, and any of the conventional sulfiding techniques are contemplated.

The pretreated and sulfided catalysts of this invention will comprise a major proportion of a solid refractory oxide cracking component including silica, plus a minor proportion, e.g., about 1 to 30% by weight, of a hydrogenating component from the group consisting of the sulfides of nickel and cobalt. The cracking component on which the hydrogenating component is deposited may consist for example of synthetic coprecipitated silica-alumina, silica-zirconia, silica-titania, silica-titania-zirconia, silica-alumina-zirconia, silica-magnesia, and the like. Acid activated montmorillonite clays may also be employed. Ordinarily, the silica content of the cracking base will be between about 20% and 90% by weight. Synthetic silica-alumina gels containing about 50–90% by weight of silica are specifically contemplated. Any of these cracking bases may be further activated by the incorporation of small amounts, e.g. 0.5–5% by weight, of acidic materials such as fluorine or chlorine.

One particular class of cracking bases contemplated herein comprises a coprecipitated mixture of 10 to 65% silica, 15 to 65% titania, and 15 to 65% zirconia. These cracking bases are mildly acidic, and are initially somewhat less active than the more highly acidic combinations such as silica-alumina (containing between about 50% and 90% silica). But the more mildly acidic cracking bases such as silica-zirconia-titania, silica-zirconia, or silica-titania, are more active in the presence of large amounts of organic nitrogen compounds in the feed.

Another type of cracking base contemplated herein comprises a decationized, zeolitic molecular sieve of the "Y" crystal type. This relatively new type of molecular sieve is manufactured by Linde Co., Tonawanda, N.Y. It is characterized by a low sodium content (1–2%) and crystal pores of relatively uniform diameter of 9–10 A. The silica/alumina mole-ratio is relatively high (about 5), as compared to the more conventional "X" type molecular sieves.

The hydrogenating component may be added to the cracking base by any of the conventional procedures, e.g., coprecipitation, impregnation, co-trituration, etc. Ordinarily, impregnation of the calcined cracking base with an aqueous solution of a decomposable salt of nickel or cobalt is preferred. Following the impregnation, the catalyst is drained, dried and calcined at e.g., 500–1,200° F. for 1 to 12 hours.

The pretreated and sulfided catalysts of this invention may be employed for the hydrocracking of substantially any hydrocarbon feedstock, but are especially applicable for hydrocracking mineral oil fractions boiling above the conventional gasoline range, i.e., above about 300° F., and usually above about 400° F., and having an end-boiling-point up to about 1,000° F., but preferably not greater than about 750° F. These feedstocks may be sulfur-free, or they may contain up to about 5% by weight of sulfur, in the form of organic sulfur compounds. They may also contain organic nitrogen compounds, but if nitrogen compounds are present, it is ordinarily necessary to utilize hydrocracking temperatures in the upper ranges hereinafter prescribed. Specific feedstocks contemplated comprise straight-run gas oils and heavy naphthas, coker distillate gas oil and heavy naphthas, deasphalted crude oils, cycle oils derived from catalytic or thermal cracking operations, and the like. These feedstocks may be derived from petroleum crude oils, shale oils, tar sand oils, coal hydrogenation products and the like. Specifically, it is preferred to employ oils having an end-boiling-point between about 500° and 750° F., an API gravity between about 30 and 40°, and containing at least about 10% by volume of acid-soluble components (aromatics plus olefins).

Difficulty is sometimes encountered in the direct hydrocracking of oils having an end-point above about 650° F. Such oils, in many instances, are found to cause a more rapid rate of coking on the catalyst, with resultant rapid decline in activity. To overcome this problem, feedstocks boiling above about 650° F. (and other feeds is desired) may be subjected to a prehydrogenation treatment to saturate at least partially the heavy polycyclic aromatic hydrocarbons containing two or more condensed rings. Prehydrogenation may be effected under conventional hydrofining conditions employing a hydrofining catalyst comprising any of the oxides and/or sulfides of the transitional metals, and especially an oxide or sulfide of a group VIII metal (particularly iron, cobalt or nickel) mixed with an oxide or sulfide of a group VIB metal (preferably molybdenum or tungsten). Alternatively, the more active metallic group VIII metals may be employed as e.g., platinum supported on a high-surface-area carrier such as alumina gel.

Hydrocracking conditions to be employed herein fall within the following general ranges:

TABLE 1

|  | Operative | Preferred |
| --- | --- | --- |
| Temperature, ° F | 400–900 | 550–800 |
| Pressure, p.s.i.g | 500–5,000 | 750–3,000 |
| H₂/oil ratio, s.c.f./bbl | 1,000–20,000 | 2,000–12,000 |
| LHSV | 0.1–10 | 0.5–5 |

The lower temperatures, from about 400° to 700° F. are normally desirable for the treatment of heavy feedstocks, e.g., those having an end-boiling-point above about 700° F. Those skilled in the art will understand that the combination of hydrocracking conditions selected should be correlated with the particular feedstock and catalyst to obtain an optimum conversion per pass, normally between about 20% and 70% by volume of feed.

The hydrocracking may be carried out under anhydrous conditions, but preferably is carried out in the presence of a small proportion of added steam. It is found that steam has a desirable effect in reducing the rate of coke deposition on the catalyst, and improving the general activity. The steam may be added as such to the feed, or to the recycle hydrogen stream, and is normally used in proportions ranging between about 0.001 and 0.2 mole thereof per mole of feed. Alternatively, the steam may be added in the form of any suitable precursor from which water is formed during hydrocracking. Examples of suitable water precursors include carbon dioxide, carbon monoxide, alcohols, ketones, aldehydes, esters and the like.

Depending upon the severity of the hydrocracking conditions employed, and the refractoriness of the feed, it will be observed that the activity of the catalyst will have declined considerably after a period of time ranging between a few hours to several months. When the activity has declined to an uneconomic level, the flow of feedstock is terminated, and the catalyst container is purged with nitrogen or other inert gas to flush out volatilizable hydrocarbons, and the catalyst is then regenerated by oxidation. Since the oxidation is very exothermic, care must be exercised to avoid temperatures in excess of about 1,500° F., in that such high temperatures tend to irreversibly deactivate the catalyst by inducing fundamental changes in the physical structure. Oxidation is normally carried out at temperatures between about 700° and 1,200° F., using dilute oxygen-containing gases as for example, flue gases or nitrogen containing about 0.2 to 5% by volume of oxygen. Oxidation is normally complete under these conditions in from about 1 to 30 hours. Following the oxidation, the catalyst is then again subjected to the steam-hydrogen pretreatment and sulfiding steps.

The following examples are cited to illustrate the critical aspects of the invention, but are not to be construed as limiting in scope. All the examples represent extended hydrocracking runs carried out at 1,500 p.s.i.g. and 2.0 LHSV, using 8,000 s.c.f. of hydrogen per barrel of feed, over a hydrocracking catalyst consisting of a coprecipitated composite of nickel, silica, zirconia and titania (approximate initial composition by weight: 25.5% NiO, 20% SiO₂, 33.4% ZrO₂, 21.1% TiO₂). The basic feedstock in all cases was a prehydrogenated coker distillate gas oil boiling between about 400° and 500° F., having an API gravity of about 39, a sulfur content of less than about 0.005%, and a nitrogen content of less than 10 parts per million. In each example, following the catalyst sulfiding treatment (if used), the hydrocracking run was carried out in the presence of about 0.2% by weight of water, based on feed, the water being added to the feed as butanol. Catalyst activity during each hydrocracking run was measured in terms of total volume-percent conversion of feed to products boiling below 400° F., while selectivity was measured in terms of the volume-percent of methane found in (1) the dry gas separated from the condensed liquid product at reactor pressure and 65° F., and (2) the flash gas separated from the condensed liquid product at atmospheric pressure and 40° F.

*Example I*

In this example, the catalyst was not sulfided, but was simply pre-reduced with dry hydrogen at 750° F., and no further pretreatment was utilized. The feed was uniform and unmodified throughout the run and the temperature was held at about 711° F. The results were as follows:

TABLE 2

| Catalyst age, hrs. | Vol. percent conversion, (Engler) | Vol. percent methane | |
|---|---|---|---|
| | | Dry gas | Flash gas |
| 1-12 | 75.5 | 2.0 | 8.2 |
| 12-28 | 73.5 | 1.8 | 8.0 |
| 28-42 | 72.0 | | 7.6 |
| 42-62 | 66.0 | 1.7 | 7.1 |

These results demonstrate that, without presulfiding, large amounts of methane are formed, indicating a relatively poor selectivity and waste of hydrogen. They also demonstrate (since 0.2% of water was present throughout) that a wet hydrogen treatment alone does not prevent excessive methane formation.

*Example II*

In this example, the catalyst was first pre-reduced with dry hydrogen, then presulfided by initiating the hydrocracking run using dry feed to which 1% of sulfur had been added as thiophene. This presulfiding was continued for 4 hours, after which the original sulfur-free feed was used, containing 0.2% by weight of water as butanol. The temperature was held at about 702° F. throughout the sulfiding and hydrocracking run. The results were as follows:

TABLE 3

| Catalyst age, hrs. | Vol. percent conversion | Vol. percent methane | |
|---|---|---|---|
| | | Dry gas | Flash gas |
| 1-18 | 50.5 | 0 | 0.03 |

These results show that dry presulfiding does markedly reduce the amount of methane produced, but that the overall activity is greatly reduced.

*Example III*

In this example, the catalyst, after dry pre-reduction with hydrogen, was subjected to a wet hydrogen treatment for 44 hours by contacting it under hydrocracking conditions with hydrogen plus the initial feed containing 0.2% by weight of water, as butanol. Following the wet hydrocracking treatment, 1.5% of sulfur (as thiophene) was added to the feed for 4 hours to effect presulfiding. The run was then continued without sulfur addition, using the original butanol-containing feed. Temperature throughout the run varied from about 701°–706° F. The results were as follows:

TABLE 4

| Catalyst age, hrs. | Vol. percent conversion | Vol. percent methane | |
|---|---|---|---|
| | | Dry gas | Flash gas |
| 1-18 } (wet H₂ pretreat) | 72 | 2.6 | 10.6 |
| 18-28 | 71 | 2.6 | 10.5 |
| 28-44 | 68 | 2.3 | 10.0 |
| 44-48 (presulfiding) | | | |
| 48- 64 | 65 | 0 | 0.1 |
| 64- 88 (catalyst pretreated with H₂–H₂O, then sulfided) | 64.5 | 0 | 0 |
| 88-112 | 62 | 0 | 0 |
| 112-136 | 62 | 0 | 0.1 |
| 136-160 | 61 | 0 | 0 |

This data shows dramatically the effect of presulfiding in reducing methane-formation, and also shows that if the sulfiding operation is preceded by a wet hydrogen pretreatment, the activity is not reduced to nearly the same level as it was in Example II, where the catalyst was sulfided without the previous water treatment.

*Example IV*

This run was carried out using essentially the same pretreatment as in Example III (dry H₂ pre-reduction followed by wet hydrocracking in the absence of sulfur, followed by presulfiding with the 1.5% sulfur-containing feed). However, in this case the hydrocracking was continued with 0.1% of sulfur in the feed (added as thiophene), as well as 0.2% of water as butanol. The temperature was maintained at 704°–707° F. throughout. The results were as follows:

TABLE 5

| Catalyst age, hrs. | Vol. percent conversion | Vol. percent methane | |
|---|---|---|---|
| | | Dry gas | Flash gas |
| 1-18 } (wet H₂ pretreat) | 72.5 | 1.0 | 6.8 |
| 18-28 | 71.5 | 1.6 | 4.8 |
| 28-32 (presulfiding) | | | |
| 32- 44 | 72.5 | 0 | 0 |
| 44- 68 | 71.5 | 0 | 0 |
| 68- 92 (wet H₂ pretreated and sulfided catalyst) | 73.0 | 0 | 0.1 |
| 92-116 | 71.0 | 0 | 0.1 |
| 116-140 | 71.0 | 0 | 0.1 |
| 140-160 | 71.0 | 0 | 0.1 |
| 160-184 | 66.5 | 0 | 0 |

This data demonstrates that the advantages of presulfiding can, in at least some cases, be obtained with no reduction whatever in activity, if the wet hydrogen pretreatment is employed. It also shows that the advantages of improved selectivity with no loss in activity are obtainable when hydrocracking sulfur-containing feeds.

Results analogous to those indicated in the foregoing examples are obtained when other hydrocracking catalysts, conditions and feedstocks described herein are employed. It is hence not intended to limit the invention to the details of the examples, but only broadly as defined in the following claims.

We claim:
1. An improved process for the hydrocracking of a hydrocarbon feedstock boiling above the gasoline range to produce gasoline-boiling-range hydrocarbons which comprises: contacting said feedstock plus added hydrogen with a hydrocracking catalyst under hydrocracking conditions including a temperature between about 550° and 850° F., to give a conversion to gasoline of about 20–70 volume-percent per pass, said catalyst comprising a minor proportion of a sulfided hydrogenating component from the group consisting of nickel and cobalt supported on a solid refractory oxide cracking base containing about 20–90% by weight of silica, said catalyst having been subjected before sulfiding to a pre-treatment contacting for about 0.1 to 100 hours at a temperature between about

300° and 900° F. with a gaseous mixture comprising hydrogen and steam in proportions of about 0.05 to 90 mole-percent of steam, based on the hydrogen content, whereby a more active hydrocracking catalyst is obtained than would be obtained if steam were omitted in said pre-treatment contacting.

2. A process as defined in claim 1 wherein said pretreatment contacting is a hydrocracking operation carried out in the presence of a substantially sulfur-free hydrocarbon feedstock, hydrogen and added water, and at superatmospheric pressures.

3. A process as defined in claim 1 wherein said refractory oxide cracking base is essentially a coprecipitated composite of silica, zirconia, and titania.

4. A process as defined in claim 1 wherein said hydrocarbon feedstock contains between about 0.01% and 5% by weight of sulfur.

5. A process as defined in claim 1 wherein said hydrocarbon feedstock is a cracked mineral oil boiling between about 400° and 650° F., and containing between about 0.01% and 5% by weight of sulfur.

6. A process as defined in claim 1 wherein said hydrocracking is carried out at a pressure between about 750 and 3,000 p.s.i.g., a hydrogen to oil ratio between about 2,000 and 12,000 s.c.f. per barrel of feed, and in the presence of between about 0.001 and 0.2 mole of added water per mole of feed.

7. A method for improving the selectivity without materially decreasing the activity of a hydrocracking catalyst, said hydrocracking catalyst initially comprising a hydrogenating component from the group consisting of nickel and cobalt deposited upon a solid, refractory oxide cracking base containing about 20–90% by weight of silica, which comprises first contacting said catalyst for about 0.1 to 100 hours with a gaseous mixture comprising hydrogen and about 0.05 to 90 mole-percent of steam, based on hydrogen, at a temperature between about 300° and 900° F., then subjecting the catalyst to a sulfiding step with a gaseous sulfiding agent, whereby a more active hydrocracking catalyst is obtained than would be obtained if steam were omitted in said pretreatment contacting.

8. A hydrocracking catalyst comprising a minor proportion of a hydrogenating component from the group consisting of nickel and cobalt sulfides, and a major proportion of a solid, refractory oxide cracking base containing about 20–90% by weight of silica, said catalyst having been pretreated with wet hydrogen and sulfided as defined in claim 7.

References Cited in the file of this patent

UNITED STATES PATENTS 2,646,388    Crawford _____ July 21, 1953
2,944,005    Scott _____ July 5, 1960